(12) United States Patent
Kaercher et al.

(10) Patent No.: US 8,739,621 B2
(45) Date of Patent: Jun. 3, 2014

(54) ELECTRICAL HEATING ELEMENT AND METHOD OF MEASURING A FILLING LEVEL

(75) Inventors: Sacha Kaercher, Neu-Isenburg (DE); Wolfgang Vogt, Kahl (DE); Stefan Pfleger, Alzenau (DE); Wilfried Harfst, Mainz (DE)

(73) Assignee: Areva GmbH, Erlangen (DE)

( * ) Notice: Subject to any disclaimer, the term of this patent is extended or adjusted under 35 U.S.C. 154(b) by 354 days.

(21) Appl. No.: 12/868,878

(22) Filed: Aug. 26, 2010

(65) Prior Publication Data

US 2011/0023598 A1 Feb. 3, 2011

Related U.S. Application Data

(63) Continuation of application No. PCT/EP2008/010970, filed on Dec. 19, 2008.

(30) Foreign Application Priority Data

Feb. 26, 2008 (DE) .......................... 10 2008 011 193

(51) Int. Cl.
*G01F 23/00* (2006.01)

(52) U.S. Cl.
USPC ................. 73/295; 73/292; 340/622; 374/45; 374/54; 376/258

(58) Field of Classification Search
USPC ................. 73/292, 295; 340/622; 374/45, 54; 376/258
See application file for complete search history.

(56) References Cited

U.S. PATENT DOCUMENTS

| | | | | |
|---|---|---|---|---|
| 3,485,100 | A * | 12/1969 | Petersen | 73/295 |
| 4,592,230 | A * | 6/1986 | Waring et al. | 73/295 |
| 4,603,580 | A * | 8/1986 | Waring | 73/295 |
| 4,805,454 | A * | 2/1989 | LeVert | 73/295 |
| 4,915,508 | A | 4/1990 | McCulloch et al. | |
| 4,969,749 | A * | 11/1990 | Hasselmann | 374/115 |
| 5,211,904 | A * | 5/1993 | Oosterkamp | 376/258 |
| 5,719,332 | A * | 2/1998 | Wallrafen | 73/295 |
| 6,054,678 | A | 4/2000 | Miyazaki | |
| 6,098,457 | A * | 8/2000 | Poole | 73/295 |
| 6,202,486 | B1 * | 3/2001 | Kemp | 73/295 |
| 7,926,345 | B2 * | 4/2011 | Kaercher et al. | 73/295 |
| 2004/0222207 | A1 | 11/2004 | Kumada | |

FOREIGN PATENT DOCUMENTS

| | | |
|---|---|---|
| DE | 19810519 A1 | 9/1998 |
| DE | 602004004827 T2 | 10/2007 |
| RU | 2114400 C1 | 6/1998 |
| RU | 2153712 C1 | 7/2000 |
| SU | 1622767 A1 | 1/1991 |
| WO | 0135421 A1 | 5/2001 |

OTHER PUBLICATIONS

International Search Report dated Apr. 21, 2009.

* cited by examiner

*Primary Examiner* — Hezron E Williams
*Assistant Examiner* — Hoang Nguyen
(74) *Attorney, Agent, or Firm* — Laurence A. Greenberg; Werner H. Stemer; Ralph E. Locher

(57) ABSTRACT

A pencil-shaped electrical heating element, in particular for application in a device for measuring filling level in a liquid container, in particular in a reactor chamber of a nuclear plant, contains an electrically-conducting sleeve and at least one electric line embedded therein which is in conducting contact with the sleeve. The electrical line has at least two line sections with differing electrical properties and/or thermal conductivities.

8 Claims, 4 Drawing Sheets

ELECTRICAL HEATING ELEMENT AND METHOD OF MEASURING A FILLING LEVEL

CROSS-REFERENCE TO RELATED APPLICATION

This is a continuation application, under 35 U.S.C. §120, of copending international application No. PCT/EP2008/010970, filed Dec. 19, 2008, which designated the United States; this application also claims the priority, under 35 U.S.C. §119, of German patent application No. DE 10 2008 011 193.7, filed Feb. 26, 2008; the prior applications are herewith incorporated by reference in their entirety.

BACKGROUND OF THE INVENTION

Field of the Invention

The present invention relates to a rod-shaped electrical heating element, containing a cladding and, embedded therein, lines to which electric energy can be supplied.

Measuring apparatuses and filling-level probes, in which the filling level height in a liquid container is inferred on the basis of the thermoelectric voltage produced by a heated thermocouple, are used in particular in nuclear power plants because they are insensitive toward radioactive radiation in comparison to measuring apparatuses based on other measurement principles and therefore can continue to reliably operate even in the case of an incident with possibly increased radiation levels. Such measuring apparatus can be applied in particular in the reactor pressure vessel of a pressurized-water reactor in order to monitor therein the level height of the cooling liquid above the fuel assemblies, which flows through the primary circuit of the nuclear plant.

The measurement principle takes advantage of the different heat transfer characteristics which occur when the heat is transferred from a heating element to a liquid coolant surrounding the heating element and also to a gaseous or vaporous medium. As long as the heating element is surrounded by liquid cooling medium, the heat it produces is dissipated quickly with the result that even in its direct vicinity the temperature is only just above that ambient temperature which would arise in the unheated case. If now the situation arises, for example during regular reactor operation or else in a reactor incident, that, due to operation or to a pressure loss in the primary circuit, the liquid level in the reactor vessel drops to below the height of the heating element which is thus surrounded by vaporous coolant, the heat transfer characteristics worsen. As a result, the temperature in the vicinity of the heating element rises, which can be detected by a thermometer arranged adjacent to the heating element or a temperature measuring sensor. Due to their reliable and robust mode of operation, suitable temperature measuring sensors which can be used are typically thermocouples which provide a thermoelectric voltage which is substantially proportional to the temperature.

Usually a plurality of heated thermocouples are arranged with typically regular mutual spacings on a rod-shaped or tubular carrier of on an elongate gauge tube, which is immersed into the liquid which is to be monitored with respect to its filling level, and into whose interior the supply and signal lines, which are necessary to supply the heating elements with power and to transmit signals to an external evaluation unit, are guided. The sensors or measurement positions arranged at various heights thus enable a digital, spatially discrete display of the filling level height in the container, wherein the (spatial) resolution depends on the number of the thermal sensors per section of height. A measuring apparatus of this type is known for example from Russian patent RU 2153712 C1. In addition to the heated thermocouples which act as primary signal transmitters, a plurality of unheated thermocouples are also arranged in the interior of the gauge tube, which provide a reference signal which is assigned to the respective primary signal. In this manner, it is possible to also consider a temporal variation of the liquid or ambient temperature when evaluating the temperature information and when ascertaining the filling level height which is derived therefrom. Without such a measure, for example, an increase or a decrease in the liquid temperature could wrongly be interpreted as a variation of the filling height or an actual change in the filling height could be "concealed" by a simultaneous temperature change of the liquid.

The ascertainment of filling level values which are as accurate as possible depends on the measuring accuracy of the thermocouples, but also on the reproducibility of the temperatures supplied by the heating elements. The known heating elements typically show no exactly linear relationships between the heating current applied and the temperature produced, especially over the whole length of the heating element.

SUMMARY OF THE INVENTION

It is accordingly an object of the invention to provide an electrical heating element and a method of measuring a filling level which overcome the above-mentioned disadvantages of the prior art devices and methods of this general type, which has properties which can be defined as accurately as possible, and which has as precise a reproducibility as possible of the structurally prespecified values.

With the foregoing and other objects in view there is provided, in accordance with the invention an apparatus for measuring a filling level in a liquid container. The apparatus contains a number of thermocouples and a heating element having an electric line. The electric line has at least one first line portion forming a cold zone and a second line portion forming a heating zone, with the second line portion having a considerably higher resistivity than the first line portion, and with a temperature dependence of resistivity in the first line portion being considerably greater than in the second line portion. The apparatus further having means for measuring a total resistance of the electric line and means for determining a temperature in a surrounding area of the first line portion on a basis of a measured total resistance.

The object is achieved according to the invention by a rod-shaped electric heating element with an electrically conducting cladding and an electric line embedded therein, which line has at least two line portions with in each case different electric properties and/or thermal conductivities. The at least one electric line is in thermal contact with the cladding, preferably at the end of the rod-shaped heating element, in order to enable a good heat transfer between the line, to which heating current can be applied, and the cladding. The heating element can be used in particular in an apparatus for measuring the filling level in a liquid container, in particular in a reactor vessel in a nuclear-engineering plant. The at least two metallic line portions with in each case different electric and/or thermal properties enable the exact definition of the thermal and electric properties and in particular exact control of the heating current, which can be transferred to the thermocouples which can be coupled to the heating element, as a function of the ambient temperature, in particular the temperature of the cooling medium.

One preferred embodiment of the invention provides for the at least two line portions with different thermal conductivities to immediately adjoin each other or follow one another. In this manner, the exact localization of the measurement site or of the coupling point between the heating element and the thermocouple to be coupled thereto can be ensured. Depending on the type of the line portion and its distance from the respective other line portion with different properties, the coupling point can be chosen for achieving the desired measurement accuracy.

The different thermal and/or electric properties of the differing line portions of the heating element can be achieved in particular by the at least two different line portions having in each case different material compositions of the metal. For example, a first line portion of the heating element can be formed by a metal with reduced thermal conductivity. The first line portion thus forms a so-called "cold part" of the heating element. In order to achieve the desired properties of the first line portion, nickel or a nickel alloy with predominant proportions of nickel is suitable, by way of example. The so-called cold part of the heating element can thus exhibit a relatively large measurement region with strong signal changes. If nickel is used for the first line portion with its relatively strong dependency of the electric resistance on the temperature, the resistance value at a temperature of 30° C. can be for example about 10 Ohm, while the resistance value at a temperature of 360° C. can be about 50 Ohm. Since these changes in the resistance have an approximately linear characteristic, exactly reproducible measurement values can be achieved as a function of the temperature of the cooling medium or the surrounding medium.

At least one second line portion, a so-called "hot part" of the heating element, is preferably formed by a metal with high thermal conductivity. A metal such as nickel chromium (NiCr) is particularly suitable for this. Optionally, only one such second line portion may be provided. However, it is possible for a plurality of "hot parts", which are composed for example of nickel chromium, to be provided in the heating element. The selected material must have as high a heat flux as possible, i.e. as high an electrical resistance as possible. In order to avoid that the linear change in resistance of the heating elements via the temperature change is based partially on the temperature prevailing in the "hot part" of the heat element, the material of the at least one second line portion has as little dependence on the resistance of the temperature as possible. Chromium nickel provides this desired property.

The heating element can further have a metallic external cladding, in particular a cladding made of stainless steel. The latter ensures the media resistance of the heating element and a longer service life. Inside the external cladding, the heating element can be embedded in an insulator. A suitable material for the insulator is in particular mineral material such as, for example, magnesium oxide (MgO).

If the heating element according to the invention is used in a filling level indicator, the upper part of the heating element is placed in an upper portion of the medium or of the cooling water. In this way, a relatively large axial temperature gradient can be covered by this upper portion of the heating element. In order to avoid inaccurate measurements in the detection of the temperature of the medium, this portion of the heating element has a material whose resistance depends only little on the temperature. Moreover, this portion of the heating element can have a larger diameter, as a result of which it is possible to adjust the linear changes in the resistance of the heating element even more accurately, since the contribution of the upper portion to the total resistance change is reduced.

The present invention further contains an apparatus for measuring the filling level in a liquid container, in particular in a reactor vessel in a nuclear-engineering plant, having a plurality of elongate, mutually spaced apart gauge tubes, each gauge tube having a number of thermocouples arranged such that they are distributed in the longitudinal direction, and wherein at least one thermocouple has a heating element according to one of the previously described embodiments. The apparatus is particularly suitable for monitoring the filling level, and can thus be used advantageously as a component in the safety system in a nuclear reactor. The invention thus also contains a nuclear-engineering plant with such an apparatus for monitoring a filling level, which has at least one heating element according to one of the previously described embodiment variants. Other fields of use of the heating element, where the accuracy of the measurement values provided is important, are of course also conceivable.

In summary, a heating element is realized according to the invention, whose current-carrying conductor ("heating wire") has at least two different zones, specifically a "hot" heating zone with a comparatively large heat output, such that a local heat transfer to a surrounding cooling medium occurs during operation in this region for measurement purposes, and—physically separate from the heating zone—a zone with negligible heat output which is colder in comparison thereto and which largely assumes the temperature of the surrounding cooling medium in this portion due to the thermal contact with the cooling medium. Owing to the physical separation of the heating zone and the unheated zone, the temperature of the surrounding cooling medium is in the region of the unheated zone not influenced further or falsified by the local heating operation in the region of the heating zone.

Due to the local heating, in combination with a temperature measuring sensor, in particular a thermocouple, arranged in the vicinity of the heating zone, the quality of the heat transfer from the heating element to the surrounding cooling medium can be metrologically detected, and thus the aggregate state of the cooling medium (liquid or gaseous) in this region can be deduced. The heating zone, together with the associated thermocouple, forms a probe, as it were, for the heat-transfer measurement and thus ultimately also for the measurement of a filling level. It can thus be decided whether the liquid level is located below or above the heating zone.

In the region of the heating zone, the heating wire is expediently composed of a material with a relatively large resistivity (specific electrical resistance) and with a comparatively low temperature dependence of the resistivity, for example of nickel chromium (NiCr). The total resistance of the heating wire portion forming the heating zone is thus substantially independent of the instantaneous material temperature which occurs as a result of the heating. In contrast, the wire or the conductor in the region of the unheated zone is expediently composed of a material with comparatively strong, preferably linear dependence of the resistivity on the material temperature which is defined in this region—as already illustrated above—substantially by way of the ambient temperature, i.e. the temperature of the surrounding cooling medium. A suitable material is nickel (Ni), for example. The temperature dependence of the total resistance of the heating wire, which additively contains the resistances of the series-connected heating zone and unheated zone, is thus substantially exclusively determined by the temperature dependence in the region of the unheated zone.

Ideally, on account of this configuration, the total resistance of the heating wire increases linearly with the temperature of the cooling medium surrounding the arrangement, specifically without being influenced by the local heating processes occurring in the region of the heating zone, which could result there—localized—to deviating and temporally varying temperatures. This total resistance, which is easy to detect metrologically, is thus a suitable variable for determining the global coolant temperature. For example, it is possible for once to record a temperature/resistance characteristic in the manner of a calibration measurement, which characteristic is used thereafter to determine the current coolant temperature on the basis of the currently measured resistance value. A separate temperature measuring sensor for determining the coolant temperature can thus possibly be omitted, or a measurement, which is redundant with respect to such a temperature measuring sensor, with a diverse measurement principle is possible. On the basis of measurement values of this type for the coolant temperature, a temperature-dependent heating current regulation for the heating element can take place in order for example to compensate for undesired secondary effects of a heat-transfer coefficient, which varies with the temperature, for the heat transfer from the heating zone of the heating element to the cooling medium.

In addition to the already mentioned heating zone and the "temperature sensitive" unheated zone, the electric conductor of the heating element can also comprise further portions which are expediently composed of a material with as little temperature dependency of the resistivity as possible and/or, on account of correspondingly largely dimensioned line diameters, which contribute only little to the total resistance of the wire or of the line and which are thus not temperature-sensitive in the meaning explained above. The line portion which acts for the temperature measurement, i.e. the temperature measurement zone, and the spatial position thereof within the overall arrangement can thus be defined precisely by way of the appropriate positioning of the material transitions.

Other features which are considered as characteristic for the invention are set forth in the appended claims.

Although the invention is illustrated and described herein as embodied in an electrical heating element and a method of measuring a filling level, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
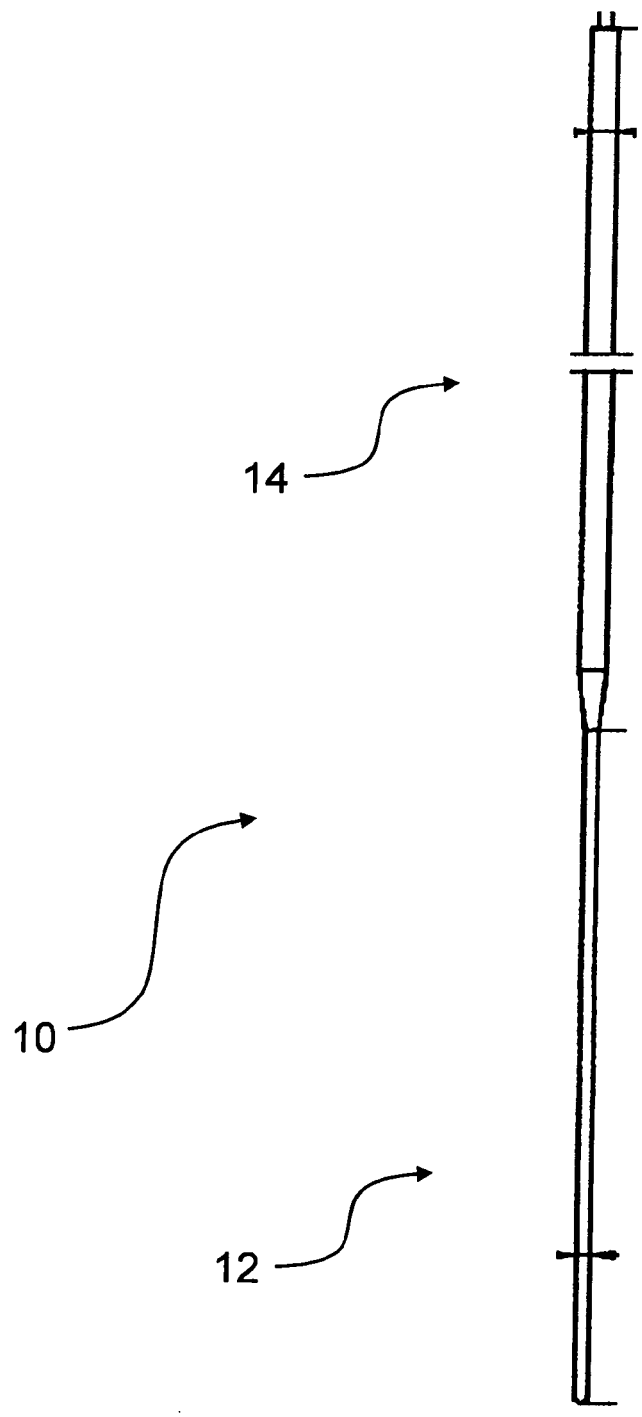
FIG. 1 is a diagrammatic, illustration of a heating element according to the invention.

Referring now to the figures of the drawing in detail and first, particularly, to FIG. 1 thereof, there is shown an exemplary embodiment of a rod-shaped electric heating element 10, which has in an elongate lower portion 12 a constant diameter which is less than the likewise constant diameter of an upper portion 14. The upper portion 14 of the heating element 10 can, for example, have a diameter of about 2 mm, while the lower portion 12 can have a diameter of about 1 mm and a length of about 500 mm. The length of the upper portion may vary, depending on the intended use and embodiment variant of the heating element 10. The larger diameter of the upper portion 14 enables an improved adjustability of the parameters of the heating element 10 since thus the contribution of the upper portion 14 to the total change in resistance is reduced, which will be explained in more detail with reference to the following figures.

Figure 2:
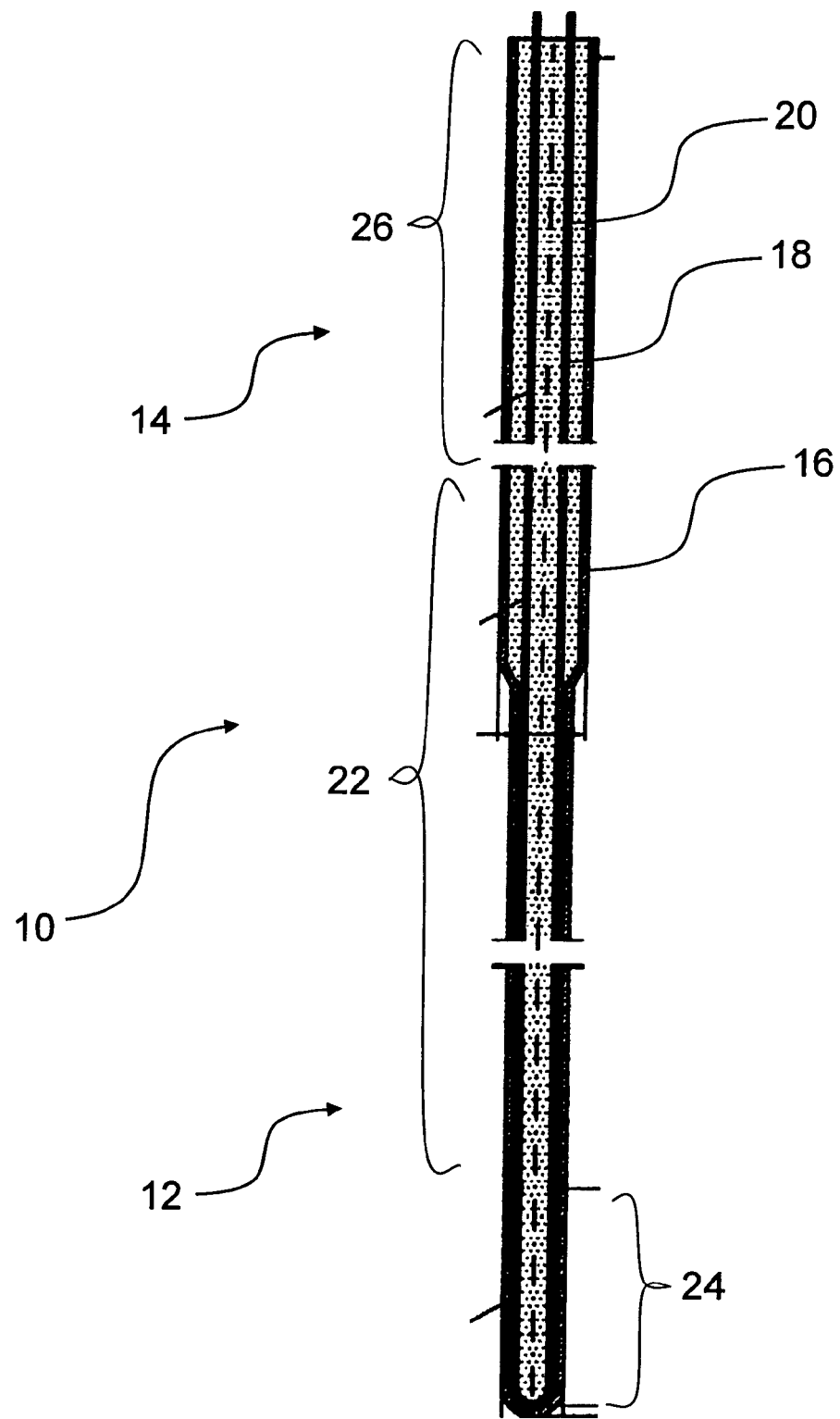
FIG. 2 is a diagrammatic, longitudinal sectional view through a first variant of the heating element.
Figure 3:
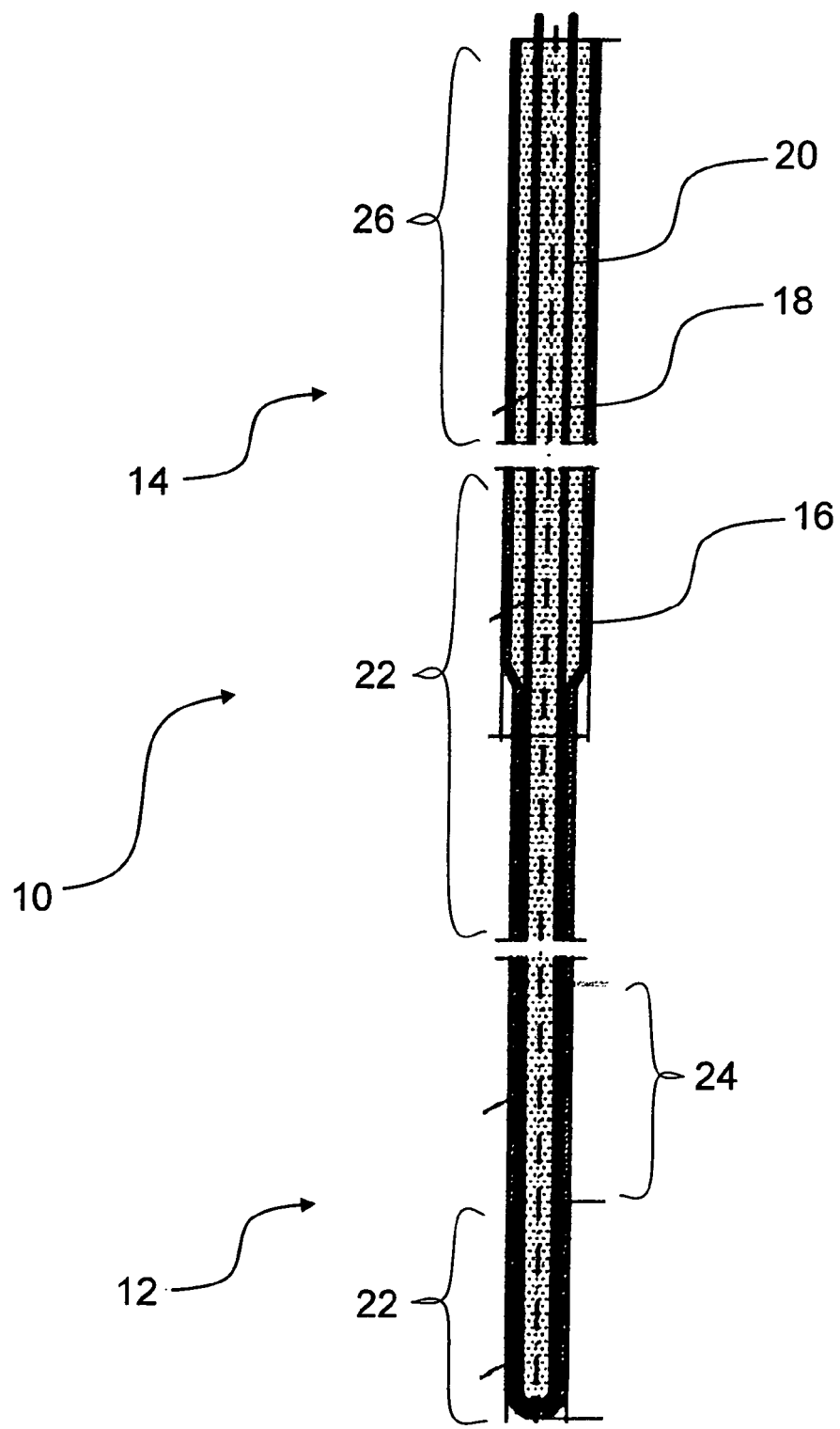
FIG. 3 is a diagrammatic, longitudinal sectional view through a second variant of the heating element.

The schematics of FIGS. 2 and 3 each show a longitudinal section of a first or second variant of the heating element 10. A U-shaped line 18 is embedded inside a metallic cladding 16, which is open at the top and closed at the bottom in a manner such that overall it has the shape of an elongate receptacle, wherein the gaps are filled by an insulator 20 made from magnesium oxide. A conducting contact between the line 18 and the cladding 16 is present in the lower portion 12 of the heating element 10. The cladding 16 can in particular be composed of a stainless steel material (e.g. 1.4306, 1.4435 or 2.4816), while the line 18 is formed from various line portions which are composed of various metals.

A first line portion 22 is formed by a metal with relatively low thermal conductivity. Nickel or a nickel alloy is particularly suitable for this. Due to the low thermal conductivity, the first line portion 22 can also be referred to as the "cold part" of the heating element 10. A second line portion 24 is formed by a metal with high thermal conductivity, with nickel chromium being particularly suitable for this. The second line portion 24 forms the actual heating zone of the heating element. Due to the high thermal conductivity, the second line portion 24 can also be referred to as the "hot part" of the heating element 10. Both the first line portion 22 and the second line portion 24 are arranged in the lower portion 12 of the heating element 10 with smaller diameter. In the upper section 14 with the larger diameter, a third line portion 26, which can be composed, for example, of copper, is located.

The two embodiment variants of FIGS. 2 and 3 differ by way of the respectively different arrangement of the second line portion 24 at different heights. While the second line portion 24, which forms the actual heating zone, is arranged in the first variant according to FIG. 2 at the lower end of the lower portion 12 and extends up to the lower end face of the cladding 16, the heating zone and thus the second line portion 24 in the second variant according to FIG. 3 are located in a central region of the lower portion 12. The lower region of the lower portion 12 is in turn filled by a line portion of the first type made from nickel or a nickel alloy. The first line portion 22 extends up to the lower end face of the cladding 16. Another line portion 22 of the first type made from nickel is in turn located above the second line portion 24 made from chromium nickel. The length of the heating zone or of the second line portion 24 can be, for example, 50 mm.

It can be seen from FIGS. 2 and 3 that the transitions between the various metals of the different line portions 22, 24 and 26 have no interruptions or breaks. The connections can be brought about for example by welding or soldering. In order to obtain a heating element with electric and thermal properties which are reproducible as accurately as possible, it is important that the two limbs of the U-shaped line 18 are of largely symmetric design, that is to say that the first and second line portions 22 and 24 at either of the limbs respectively have exactly the same length and are positioned at the same height.

Figure 4:
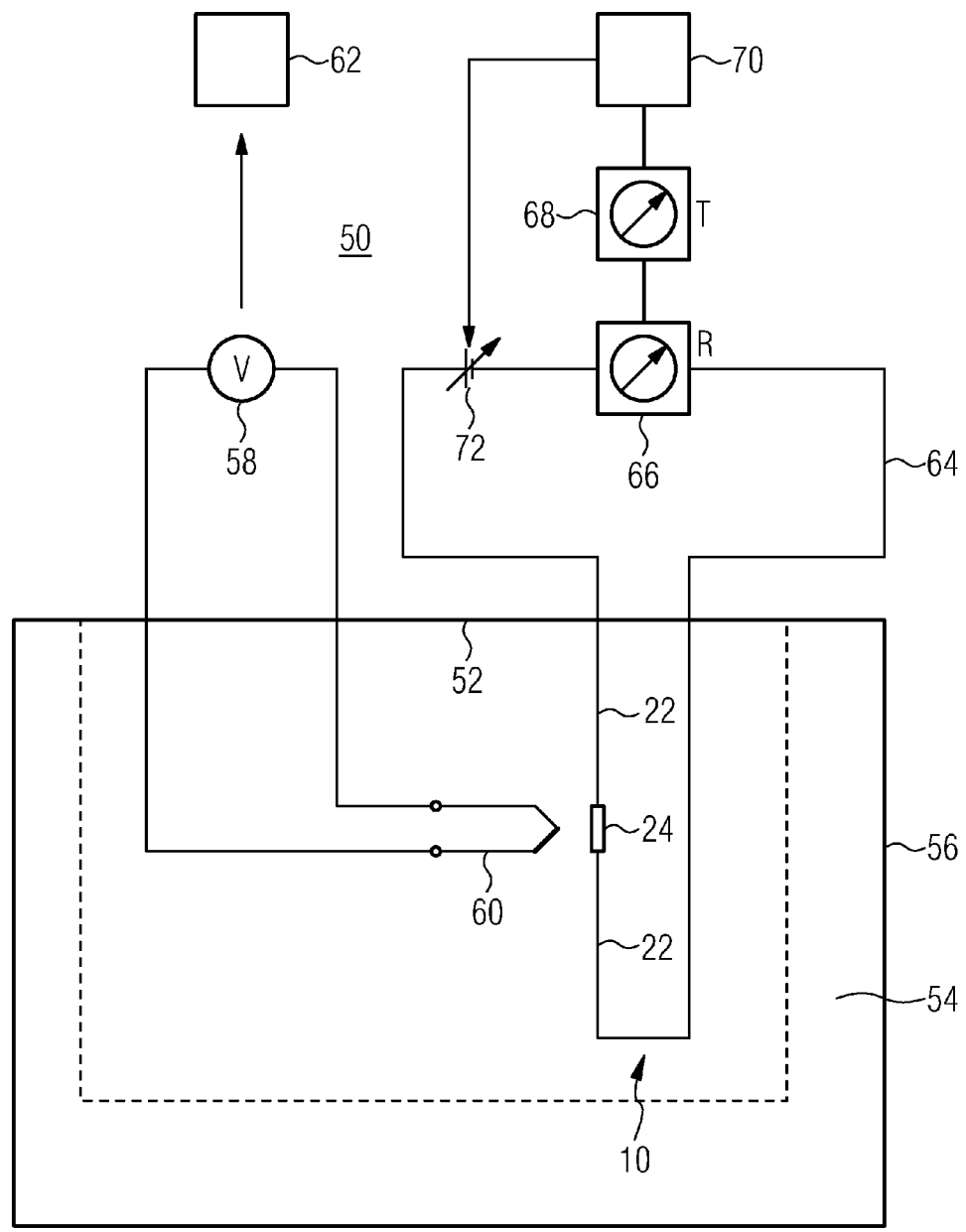
FIG. 4 is a block diagram of an apparatus for measuring a filling level in a liquid container according to the invention.

FIG. 4 illustrates a device 50 according to the invention for measuring the filling level 52 in a liquid (fluid) container 56 partially filled with a cooling liquid 54 and contains a thermal element 60 connected with a voltage measuring device 58 for measuring a thermovoltage. The thermal element 60 is heated by an assigned heating element 10. According to a height of the filling level 52, the heat transition from the heating element 10 onto the thermal element 60 varies in intensity, which is utilized in a known manner per se in an evaluation device 62 assigned to the voltage measuring device 58 for providing a characteristic value of the filling level.

A heating wire 64 of the heating element 10 contains the second line section 24 with relatively high, however only slightly temperature-dependent specific resistance, which forms the actual heating zone, in the vicinity of the thermal element 60 is arranged, and the first line section 22 with the relatively low, however strongly temperature-dependent specific resistance.

Thus, a temperature T of the cooling liquid 54 in the liquid (fluid) container 56 can be determined by the measurement of an overall resistance R of the heating wire 64 in an evaluation device 68, the measurement being performed in a measuring device 66. The thus determined temperature value can be used, for example, in a control unit 70 for a temperature-dependent control of the heating current (via a controllable heating current source 72) in order to compensate—at a constant filling level—the influence of the cooling liquid temperature onto the thermovoltage supplied by the thermal element 60.

Therefore, several heating zones are connected in series with one another with, and in each case, assigned thermal elements can be provided for a better resolution of the filling level measurement. The heating element and the thermal elements can be arranged in a joint cladding tube or the like (schematically indicated by broken lines).

The invention claimed is:

1. An apparatus for measuring a filling level in a liquid container, the apparatus comprising:
    a number of thermocouples;
    a heating element having an electric line, said electric line having at least one first line portion forming a cold zone and a second line portion forming a heating zone, with said second line portion having a considerably higher resistivity than said first line portion, and with a temperature dependence of resistivity in said first line portion being considerably greater than in said second line portion;
    means for measuring a total resistance of said electric line; and
    means for determining a temperature in a surrounding area of said first line portion on a basis of a measured total resistance of said electric line.

2. The apparatus according to claim 1, wherein the resistivity of said first line portion is an approximately linear function of the temperature.

3. The apparatus according to claim 1, wherein said second line portion is formed from nickel chromium (NiCr).

4. The apparatus according to claim 1, wherein said first line portion is formed from one of nickel (Ni) and a nickel alloy with a predominant proportion of nickel.

5. The apparatus according to claim 1, further comprising:
    an external cladding; and
    an insulator disposed inside said external cladding, said heating element being embedded at least in a portion-wise manner in said insulator.

6. The apparatus according to claim 5, wherein said insulator is composed of a mineral material.

7. A method for operating an apparatus for measuring a filling level in a liquid container, the apparatus having a number of thermocouples and a heating element with an electric line, the electric line having at least one first line portion forming a cold zone and a second line portion forming a heating zone, with the second line portion having a considerably higher resistivity than the first line portion, and with a temperature dependence of a resistivity in the first line portion being considerably greater than in the second line portion, which comprises the steps of:
    measuring a total resistance of the electric line; and
    ascertaining a temperature in a surrounding area of the first line portion on a basis of a measurement value of the total resistance of the electric line.

8. The method according to claim 7, which further comprises using the temperature ascertained for a temperature-dependent heating current regulation.

* * * * *